United States Patent
Sugino et al.

(10) Patent No.: US 8,502,908 B2
(45) Date of Patent: Aug. 6, 2013

(54) IMAGING APPARATUS, IMAGING APPARATUS BODY AND REPORTING TERMINAL

(75) Inventors: Yoichi Sugino, Osaka (JP); Takuma Masuda, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/368,978

(22) Filed: Feb. 8, 2012

(65) Prior Publication Data

US 2012/0140090 A1 Jun. 7, 2012

Related U.S. Application Data

(63) Continuation of application No. 12/393,394, filed on Feb. 26, 2009, now Pat. No. 8,164,671.

(30) Foreign Application Priority Data

Mar. 3, 2008 (JP) ................................. 2008-052427

(51) Int. Cl.
*G02B 13/16* (2006.01)
*H04N 5/225* (2006.01)

(52) U.S. Cl.
USPC ............ 348/335; 348/340; 348/345; 348/348

(58) Field of Classification Search
USPC .................. 348/335, 340, 345, 348
See application file for complete search history.

(56) References Cited

U.S. PATENT DOCUMENTS

| 7,929,042 B2 * | 4/2011 | Terashima .................... 348/345 |
| 2002/0169583 A1 | 11/2002 | Gutta et al. |
| 2003/0103149 A1 | 6/2003 | Kinjo et al. |
| 2004/0150728 A1 | 8/2004 | Ogino |
| 2006/0013578 A1 | 1/2006 | Sato et al. |
| 2007/0115363 A1 | 5/2007 | Nakamura |

FOREIGN PATENT DOCUMENTS

| JP | 05-061092 A | 3/1993 |
| JP | 07-030795 A | 1/1995 |
| JP | 2002-199383 A | 7/2002 |
| JP | 2002-328408 A | 11/2002 |
| JP | 2005-341449 A | 12/2005 |
| JP | 2007-049229 A | 2/2007 |
| JP | 2007-129480 A | 5/2007 |
| JP | 2007-142866 A | 6/2007 |

* cited by examiner

*Primary Examiner* — Yogesh Aggarwal
(74) *Attorney, Agent, or Firm* — Pearne & Gordon LLP

(57) ABSTRACT

An imaging apparatus capable of assisting such shooting that a designated subject is accommodated in a predetermined reference range without user's continuing gazing at a display screen. Imaging apparatus 100 has: imaging optical system 310 that forms an optical image of a subject; solid-state image sensor 330 that converts the optical image into an electrical signal; video signal processing section 350 that carries out a predetermined processing for the electrical signal and generates image data; tracking processing section 390 that decides whether or not the designated subject is in a predetermined range within a trackable range, using the image data generated in video signal processing section 350; and reporting section 410 that reports a decision result in tracking processing section 390 by means of light.

3 Claims, 11 Drawing Sheets

IMAGING APPARATUS, IMAGING APPARATUS BODY AND REPORTING TERMINAL

This application is a continuation of U.S. patent application Ser. No. 12/393,394, filed Feb. 26, 2009, which is incorporated herein by reference in its entirety.

CROSS REFERENCE TO RELATED APPLICATIONS

The disclosure of Japanese Patent Application No. 2008-052427, filed on Mar. 3, 2008, including the specification, drawings and abstract, is incorporated herein by reference in its entirety.

BACKGROUND

1. Technical Field

The technical field relates to an imaging apparatus that shoots an optical image of a subject, an imaging apparatus body and a reporting terminal that presents a predetermined notice in the shooting using the imaging apparatus body.

2. Description of the Related Art

Conventionally, when shooting a moving subject such as a child by a video camera or camcorder, the camcorder user needs to gaze at the image of the subject in the view finder or monitor so as not to make the image of the subject go out of the frame. However, continuing gazing at the image of the subject is a heavy burden upon the user and also makes it difficult for the user to learn the surrounding situation.

For example, Patent Document 1 (Japanese Patent Application Laid-Open No. 2005-341449) proposes a technique of, in an imaging apparatus with a monitor, tracking the designated subject and displaying where the tracking subject is in the display screen in the monitor (hereinafter simply "display screen").

FIG. 1 is an example of the display screen of the imaging apparatus disclosed in Patent Document 1. The imaging apparatus disclosed in Patent Document 1 specifies the location of image 10 of the subject designated as a tracking target (hereinafter simply "main subject") from image data obtained as a result of imaging, and displays arrow 30 or the frame showing the specified location on display screen 20. By this means, the user is able to readily identify the location of main subject 10 on display screen 20 and prevent main subject 10 from going out of the frame without continuing gazing at main subject 10.

Further, for example, Patent Document 2 (Japanese Patent Application Laid-Open No. 2007-129480) proposes an imaging apparatus that displays in which direction the main subject who has gone out of the frame has moved. The imaging apparatus disclosed in Patent Document 2 tracks the motion of the main subject, and, when the main subject has gone out of the frame, displays an arrow showing the direction in which the subject has moved. By this means, the user is able to readily decide in which direction the main subject has gone out of the frame, without continuing gazing at the main subject, and readily make the main subject re-enter the frame.

However, in actual shooting, often there are cases where the user performs shooting operation looking away from the display screen such as when the user waves his/her hand directly looking at the person of the main subject. Therefore, it is preferable that shooting images continues preventing the main subject from going out of the frame as few as possible even while the user is looking away from the display screen. For this purpose, when the main subject is about to go out of the frame or when the main subject has gone out of the frame, the user needs to notice this immediately to look back at the display screen.

However, when the user is looking away from the display screen even in the shooting using either the imaging apparatus disclosed in Patent Document 1 or the imaging apparatus disclosed in Patent Document 2, even if the main subject is about to go out of the frame or has gone out of the frame, the user cannot notice this immediately.

Similarly, when the main subject hides behind other objects or when there is an object similar to the outlook of the main subject in the shooting range, cases may occur where tracking processing ends or fails. In such cases, to prevent the main subject from going out of the frame, the user needs to notice this immediately and look back at the display screen. However, even if either the imaging apparatus disclosed in Patent Document 1 or the imaging apparatus disclosed in Patent Document 2 is used, the user cannot notice immediately that the tracking processing has ended or failed.

SUMMARY

The object is to provide an imaging apparatus, an imaging apparatus body and a reporting terminal that can assist such shooting that a designated subject is accommodated in a predetermined reference range without user's continuing gazing at a display screen.

The imaging apparatus employs a configuration including: an imaging optical system that forms an optical image of a subject; an imaging section that converts the optical image into an electrical signal; a signal processing section that carries out a predetermined processing for the electrical signal and generates image data; a deciding section that decides whether or not a designated subject is in a predetermined reference range within a trackable range, using the image data generated in the signal processing section; and a reporting section that reports a decision result in the deciding section by means of light.

The imaging apparatus body employs a configuration including: an imaging optical system that forms an optical image of a subject; an imaging section that converts the optical image into an electrical signal; a signal processing section that carries out predetermined processing for the electrical signal and generates image data; a deciding section that decides whether or not a designated subject is in a predetermined reference range within a trackable range, using the image data generated in the signal processing section; and a transmitting section that transmits a decision result in the deciding section by means of wireless.

The reporting terminal that is able to carry out wireless communication with the imaging apparatus body, employs a configuration including: a receiving section that receives the decision result transmitted from the transmitting section; and a reporting section that reports the received decision result by means of sound.

The reporting terminal that is able to carry out wireless communication with the imaging apparatus body, employs a configuration including: a receiving section that receives the decision result transmitted from the transmitting section; and a reporting section that reports the received decision result by means of vibration.

The present apparatus makes it possible to assist such shooting that the designated subject is accommodated in a predetermined reference range in a trackable range without user's continuing gazing at the display screen. That is, whether or not the designated subject is in a predetermined reference range is reported to the user by means of light, sound or vibration, so that the user is able to shoot images in such a way that the designated subject is accommodated in the predetermined reference range without the user's continuing gazing at the display screen.

DETAILED DESCRIPTION OF THE PREFERRED EMBODIMENT

Hereinafter, embodiments of the present invention will be explained in detail with reference to the accompanying drawings.

Embodiment 1

First, a summary of an imaging apparatus according to Embodiment 1 of the present invention will be explained. Embodiment 1 is an example where the present invention is applied to a home video camera or camcorder with a tracking function for tracking a main subject.

Figure 1:
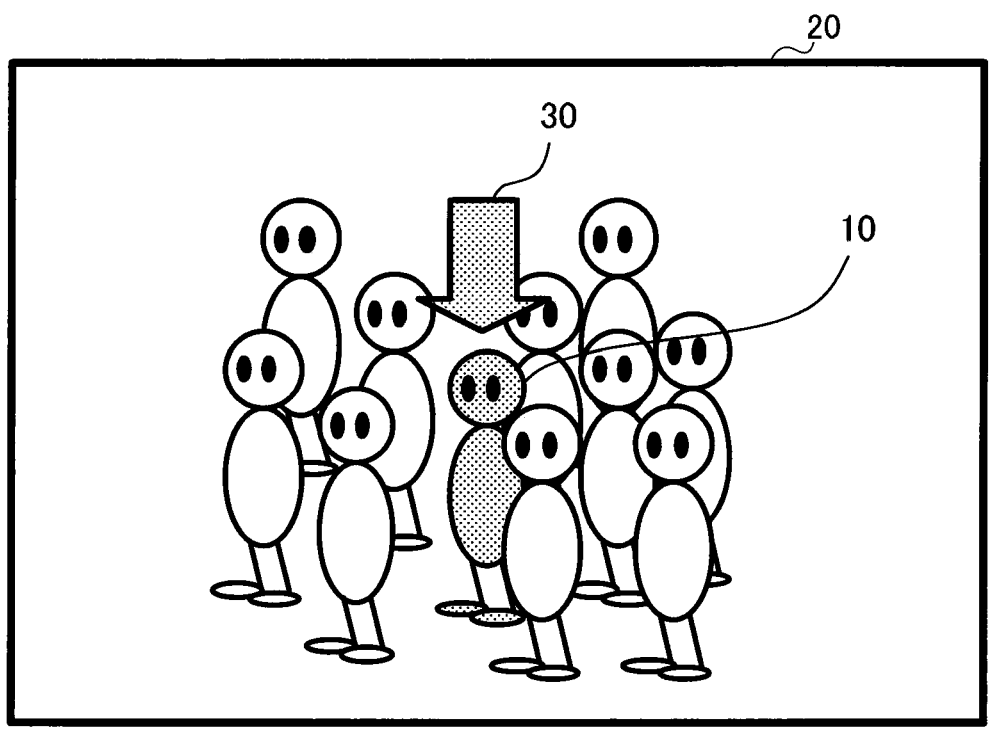
FIG. 1 is a plain view showing an example of a display screen in a conventional imaging apparatus.
Figure 2:
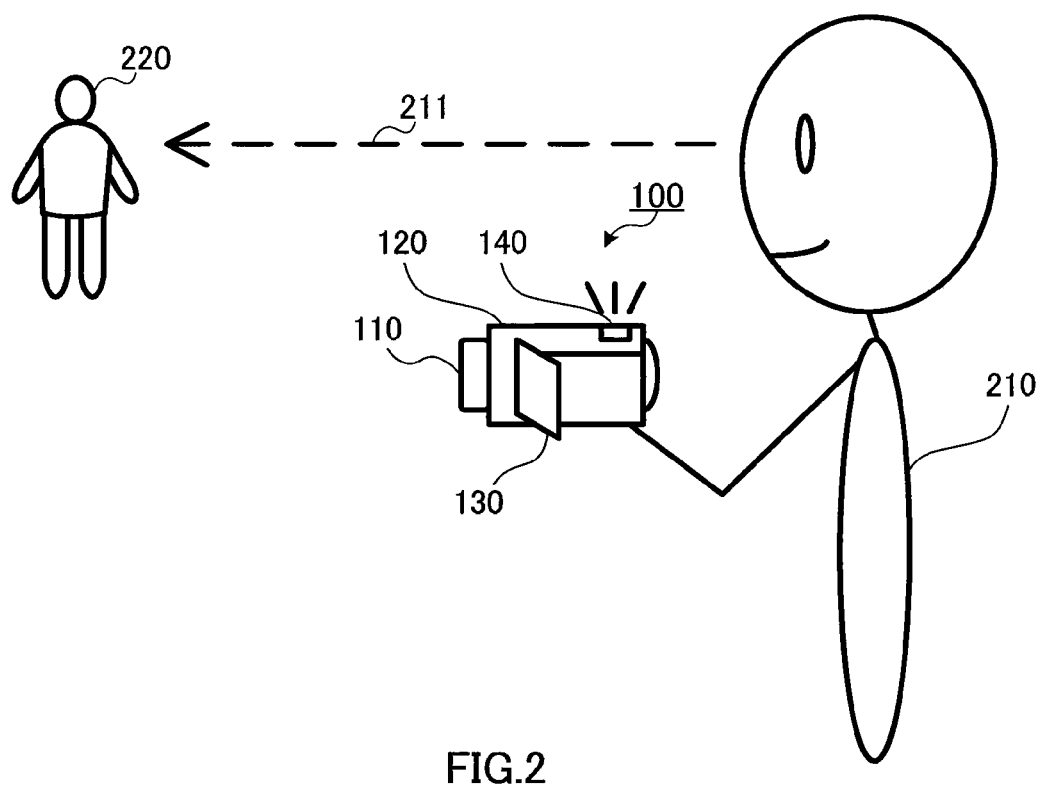
FIG. 2 shows an example where an imaging apparatus according to Embodiment 1 of the present invention is used to shoot images.

FIG. 2 shows an example where the imaging apparatus according to Embodiment 1 of the present invention is used to shoot images.

As shown in FIG. 2, imaging apparatus 100 has: lens section 110 that forms an optical image of a subject; apparatus body 120 that generates image data from the formed optical image and records the image data; and monitor 130 that displays an image of the generated image data on a liquid crystal panel (not shown). Further, imaging apparatus 100 locates LED (light emitting diode) section 140 in an upper surface of apparatus body 120. This LED section 140 switches an illuminating state depending on whether or not a main subject is located in an image area displayed on monitor 130 (hereinafter "display range").

User 210 shoots images by holding apparatus body 120 of imaging apparatus 100 by one hand and adjusting the orientation of apparatus body 120 such that main subject 220 is located in the display range in monitor 130.

At this point, LED section 140 is located in the upper surface of apparatus body 120 and therefore is more likely to enter the view of user 210. Consequently, even when user 210 moves eyes away from the display screen of monitor 130 to turn gaze 211 to main subject 220, user 210 is able to readily recognize whether or not the main subject is in the display range in monitor 130 based on the illuminating state of LED section 140. Further, when the main subject has gone out of the display range, user 210 is able to notice this immediately and move gaze 211 back to monitor 130. Consequently, without continuing gazing at the display screen, user 210 is able to shoot images preventing the main subject from going out of the frame as few as possible.

Here, "going out of the frame" refers to the concept including that the location of the main subject has moved outside the display range and that the location of the main subject cannot be detected. Further, "entering the frame" refers to the concept including that the location of the main subject has moved in the display range and the location of the main subject can be detected.

Furthermore, a "frame-in state" means the state where imaging apparatus 100 detects that the main subject is located in a predetermined range (hereinafter "frame-in area") within the display range and one-size smaller than the display range, and a "frame-out state" means the state where imaging apparatus 100 is not in the frame-in state. In the frame-in state, the main subject is little likely to go out of the frame, and, in the frame-out state, the main subject is not located in the display range or is located in an area of the display range where the main subject is likely to go out of the frame. Although whether or not the main subject is in the display range is reported with the above explanation, to be more accurate, whether or not the main subject is in the frame-in area is reported.

In practice, although there are cases where the image area (i.e. trackable range) in which the main subject can be tracked, the image area displayed on monitor 130 and the image area actually recorded are different, assume that these areas match in the present embodiment.

Figure 3:
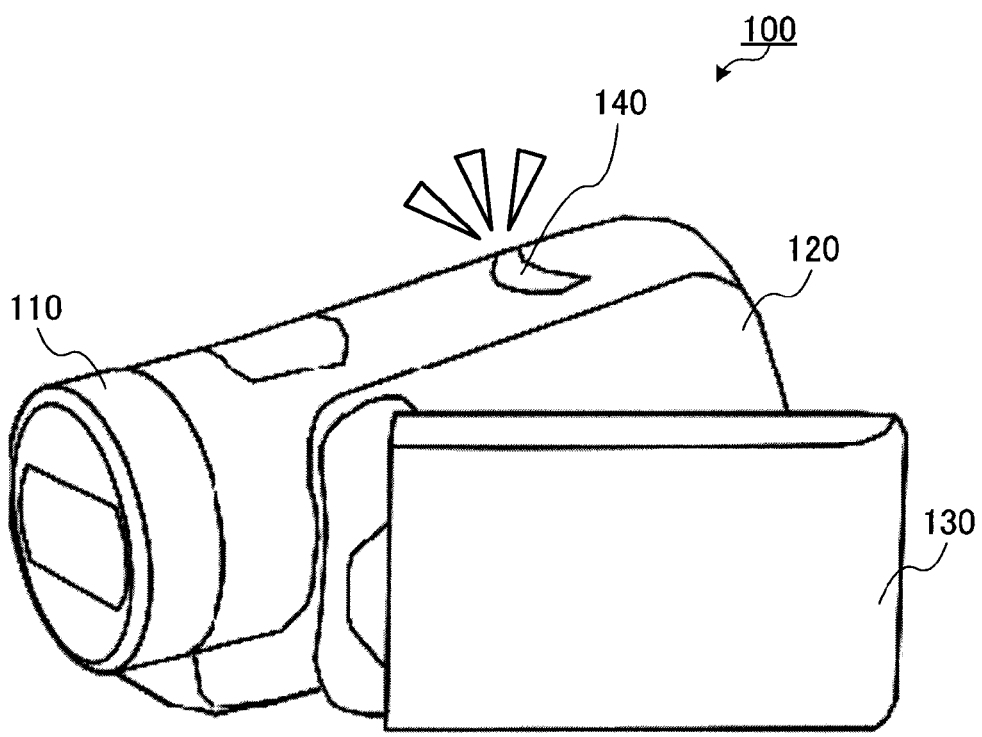
FIG. 3 is a perspective view showing an outlook of the imaging apparatus according to Embodiment 1.

FIG. 3 is a perspective view showing an outlook of the imaging apparatus according to Embodiment 1 of the present invention.

As shown in FIG. 3, monitor 130 is attached openable with respect to apparatus body 120 and rotatable in the vertical direction in an open state. Consequently, when shooting, user 210 is able to operate imaging apparatus 100 in a low position without raising the arm with an effort, generally by opening monitor 130 with respect to apparatus body 120 and rotating the display screen slightly upward. At this point, as shown in FIG. 2, user 210 postures looking down on imaging apparatus 100 from above and, consequently, is able to visually check LED section 140 located in the upper part of apparatus body 120 at ease.

Next, the configuration of imaging apparatus 100 will be explained.

Figure 4:
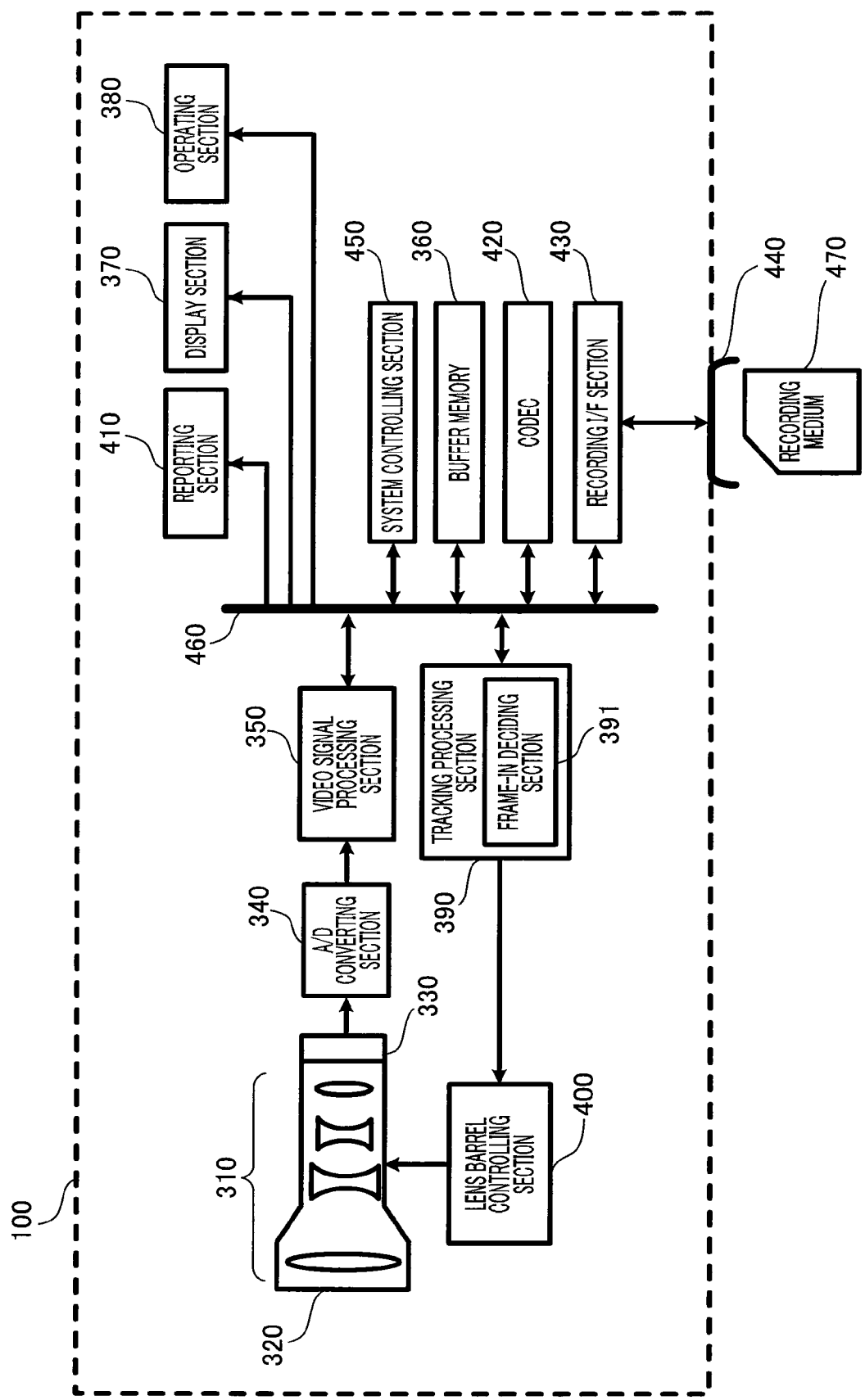
FIG. 4 is a block diagram showing a configuration of the imaging apparatus according to Embodiment 1.

FIG. 4 is a block diagram showing a configuration of imaging apparatus 100.

In FIG. 4, imaging apparatus 100 has: imaging optical system 310; lens barrel 320; solid-state image sensor 330; A/D (analog-to-digital) converting section 340; video signal processing section 350; buffer memory 360; display section 370; operating section 380; tracking processing section 390; lens barrel controlling section 400; reporting section 410; CODEC (coder-decoder) 420; recording interface (I/F) section 430; socket 440; and system controlling section 450.

Imaging optical system 310 and lens barrel 320 are located in lens section 110 of FIG. 3. Display section 370 is located in monitor 130 of FIG. 3. Each section other than these is located in apparatus body 120 of FIG. 3. Further, the main apparatus sections in imaging apparatus 100 are connected with system bus 460.

Imaging optical system 310 has a group of a plurality of lens elements and forms an optical image of the subject on the imaging plane of solid-state image sensor 330. The lens element group of imaging optical system 310 includes a focus lens that moves along the optical axis to adjust the focus adjustment state and a zoom lens that moves along the optical axis to vary the magnification of an optical image of the subject.

Lens barrel 320 supports imaging optical system 310 inside. Lens barrel 320 itself is supported by lens barrel controlling section 400 (explained later) such that lens barrel 320 is controllably driven in the pitching direction and yawing direction of apparatus body 120. That is, under control of lens barrel controlling section 400, lens barrel 320 can be adjusted in the optical axis direction in a predetermined range.

Solid-state image sensor 330 converts the optical image formed by imaging optical system 310 into an electrical signal (i.e. an analog video signal). Solid-state image sensor 330 includes, for example, CCD (charge coupled device) or CMOS (complementary metal oxide semiconductor).

A/D converting section 340 converts the analog video signal outputted from solid-state image sensor 330 into a digital video signal.

Video signal processing section 350 carries out predetermined video signal processing including gain adjustment, noise cancellation, gamma correction, aperture processing and knee processing with respect to the digital video signal outputted from A/D converting section 340 and converts the digital video signal into a RGB format video signal. Further, video signal processing section 350 converts the generated RGB format video signal into a Y/C format video signal.

Buffer memory 360 accumulates the RGB format video signal outputted from video signal processing section 350 and stores the RGB format video signal as digital video information on a temporary basis.

Display section 370 is a monitor and includes a D/A (digital-to-analog) converting section (not shown) and the above-explained liquid crystal panel. Display section 370 generates output video data by superimposing OSD (on screen display) displays such as various operation icons and character sequence data upon digital video information accumulated in buffer memory 360. Then, display section 370 inputs the generated output video data to the liquid crystal panel through the D/A converting section, and displays the output video data as a visible image.

Operating section 380 includes, for example, various buttons and levers such as a mode switch button, a zoom lever, a power supply button, a shooting button, a menu button, a direction button and an enter button although they are not shown, and receives the operation for imaging apparatus 100 from user 210. The mode switch button is used to switch a plurality of operation modes in imaging apparatus 100. These operation modes include: normal shooting mode for normal shooting; subject storing mode for storing the features of the main subject; tracking shooting mode for shooting images while tracking the main subject; and playback mode for playing back video data that has been shot. The zoom lever is used to zoom up the image. The power supply button is used to turn on and off the main power supply in imaging apparatus 100. The shooting button is used to start and stop shooting images. The menu button is used to display various menus related to the setting of imaging apparatus 100. The direction button can be pressed up, down, left, right and in and is used to switch the zooming position and menu items. The enter button is used to perform various enter operations.

When the tracking shooting mode is selected, tracking processing section 390 carries out tracking processing for tracking the main subject in the display range based on the RGB format video signal generated in video signal processing section 350 and generating location information showing the current location of the main subject in the display range. Further, tracking processing section 390 has frame-in deciding section 391 that generates report information showing whether or not the image of the main subject is located in the display range, based on the location information resulting from tracking processing (for example, tracking processing section 390 builds in frame-in deciding section 391 as a function).

Lens barrel controlling section 400 controls lens barrel 320 to be driven in the pitching direction or the yawing direction such that the main subject that is being tracked is located in the center of the display range, based on the location information outputted from tracking processing section 390.

Reporting section 410 has LED section 140 of FIG. 3 and switches the illumination pattern or light emission level of LED section 140 according to LED control information outputted from system controlling section 450. LED control information includes an ID value that can be used to identify which information of the illumination pattern or the light emission level it shows, and an illumination pattern number showing the illumination pattern or a numerical value showing the light emission level. LED control information is generated based on the report information.

CODEC 420 reads out digital video information stored in buffer memory 360, carries out non-invertible compression processing for the digital video information read out and converts the obtained digital video signal into compressed video data of a predetermined format such as MPEG-2 (Moving Picture Experts Group phase 2) and H.264/MPEG-4 AVC (Moving Picture Experts Group phase 4 Part 10 Advanced Video Coding). The digital video signal converted into the compressed video data is provided in buffer memory 360 likewise before compression. The compressed video data on buffer memory 360 is recorded in recording medium 470 electrically connected with socket 440 through recording I/F section 430.

System controlling section 450 is formed with a CPU (central processing unit), ROM (read only memory) that records a program and RAM (random access memory) for executing the program (all not shown), and integrally controls through system bus 460 the operation in each section of imaging apparatus 100. To be more specific, system controlling section 450 integrally controls such processings as processing of user operation information obtained from operating section 380, various commands to video signal processing section 350 and tracking processing section 390, LED control command for reporting section 410, generation of display data to display shot images and OSD images in display section 370, execution and termination of video image compression processing in CODEC 420, and data transfer between buffer memory 360 and recording I/F section 430. For example, the above LED control command is carried out by, in system controlling section 450, generating the above LED information based on report information from frame-in deciding section 391 of tracking processing section 390 and outputting the generated LED information to reporting section 410.

Imaging apparatus 100 with such a configuration makes it possible to report to the user 210 whether or not imaging apparatus 100 is in the frame-in state, based on the illuminating state of LED section 140 located in the upper surface of apparatus body 120.

Next, the operation of imaging apparatus 100 having the above configuration will be explained. The operations other than the operations in tracking shooting mode are the same as the conventional operations, and, consequently, only the operations of imaging apparatus 100 in tracking shooting mode will be explained.

While imaging apparatus 100 is in tracking shooting mode, video signal processing section 350 generates an RGB format video signal from the shot image and outputs the generated RGB format video signal in frame units to tracking processing section 390 through system bus 460. Further, while imaging apparatus 100 is in tracking shooting mode, video signal processing section 350 further generates Y/C format video signal from the RGB format video signal and outputs the generated Y/C format video signal to buffer memory 360 through system bus 460. Further, video signal processing section 350 finds the average level of the Y signal per frame when the Y/C format video signal is generated, and transmits the average level to system controlling section 450.

Tracking processing section 390 acquires and holds, for example, in subject storing mode in advance, the features of the main subject. Here, the features refers to a numerical value representing the features of an image such as the color histogram, and is calculated by carrying out a predetermined arithmetic operation processing for image data. In subject storing mode, tracking processing section 390 displays the frame for registering the main subject in display section 370, extracting the features in the part within the frame, of the shot image, and registers this features as the features of the main subject. To specify the main subject, user 210 only needs to switch imaging apparatus 100 to subject storing mode, adjust the location for shooting images and/or the zooming magnification such that the face of a random subject is accommodated in the frame, and shoot a still image. Further, the features of the main subject may be acquired not in subject storing mode but each time mode is switched to tracking shooting mode. Further, the features of the main subject extracted by other apparatuses may be acquired through recording medium 470.

Figure 5:
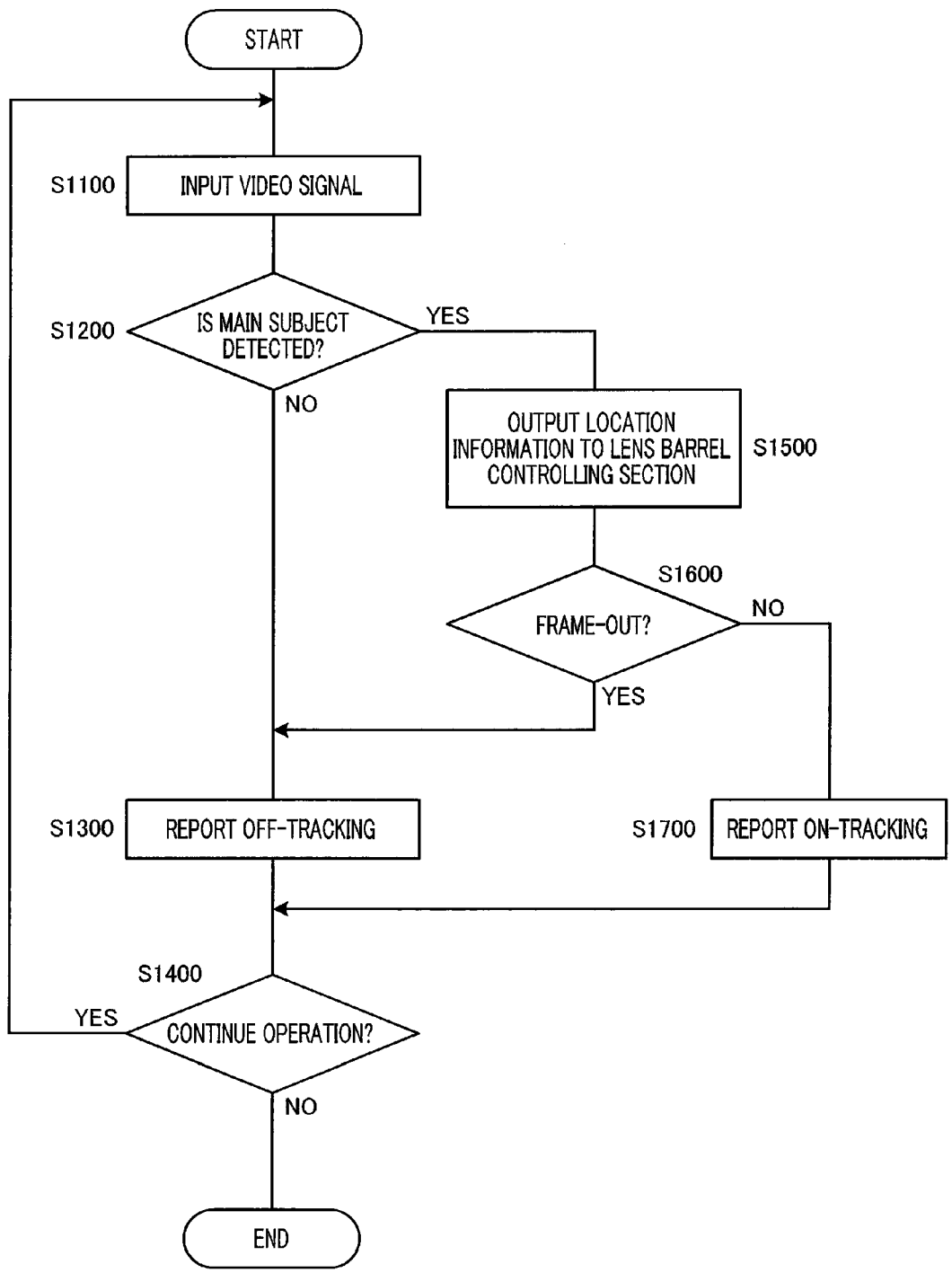
FIG. 5 is a flowchart showing the operation of a tracking processing section according to Embodiment 1.

FIG. 5 is a flowchart showing the operation of tracking processing section 390 of FIG. 4.

First, in step S1100, tracking processing section 390 receives as input one frame of an RGB format video signal outputted from video signal processing section 350.

Then, in step S1200, tracking processing section 390 executes the above tracking processing. With the present embodiment, this tracking processing is realized by storing the features of the main subject when tracking starts and searching for an area highly correlated with the stored features from an input video image during tracking processing. When tracking processing section 390 cannot detect the main subject as a result of tracking processing (S1200: NO), tracking processing section 390 proceeds to step S1300. The details of tracking processing will be explained later.

In step S1300, tracking processing section 390 outputs report information showing that the main subject is not being tracked (i.e. off tracking), to reporting section 410 from built-in frame-in deciding section 391. As a result, reporting section 410 reports that the main subject is not being tracked, that is, that the main subject is in the frame-out state, by the illuminating state of LED section 140. Switching patterns of the illuminating states in LED section 140 will be explained below.

Then, in step S1400, tracking processing section 390 decides whether or not to continue the operation in tracking shooting mode. When deciding to continue the operation in tracking shooting mode (S1400: YES), tracking processing section 390 returns to step S1100.

On the other hand, when the main subject can be detected as the result of tracking processing in step S1200 (S1200: YES), tracking processing section 390 proceeds to step S1500.

In step S1500, tracking processing section 390 outputs information about the detected location of the main subject, to lens barrel controlling section 400. As a result, lens barrel 320 is controlled to be driven such that the main subject is located in the center of the display range.

However, it is difficult to maintain the frame-in state of imaging apparatus 100 only by the adjustment of lens barrel 320 in the optical axis direction by the control of lens barrel controlling section 400. Consequently, to continue shooting the main subject, at least when imaging apparatus 100 enters the frame-out state, user 210 needs to check the display screen and adjust the location and orientation of imaging apparatus 100 such that imaging apparatus 100 enters the frame-in state. Further, to enable adjustment by user 210, at least when imaging apparatus 100 transitions to the frame-out state, this needs to be reported to user 210.

Consequently, in step S1600, tracking processing section 390 decides whether or not imaging apparatus 100 is in the frame-out state based on the detected location of the main subject. To be more specific, tracking processing section 390 makes built-in frame-in deciding section 391 decide whether or not the location of the main subject is outside the frame-in area. This is because, when the main subject is located outside the frame-in area, the main subject is very likely to completely go out of the frame immediately afterwards. Further, this is also because, after the main subject has completely gone out of the frame, it is difficult to decide in which direction the main subject has gone out of the frame and immediately place imaging apparatus 100 again in the frame-in state.

Whether or not the main subject is located in the frame-in area can be decided by, for example, deciding whether or not the coordinate of the center of the image area detected as the main subject is located in the area corresponding to the frame-in area in the coordinate system based on the display range.

Figure 6:
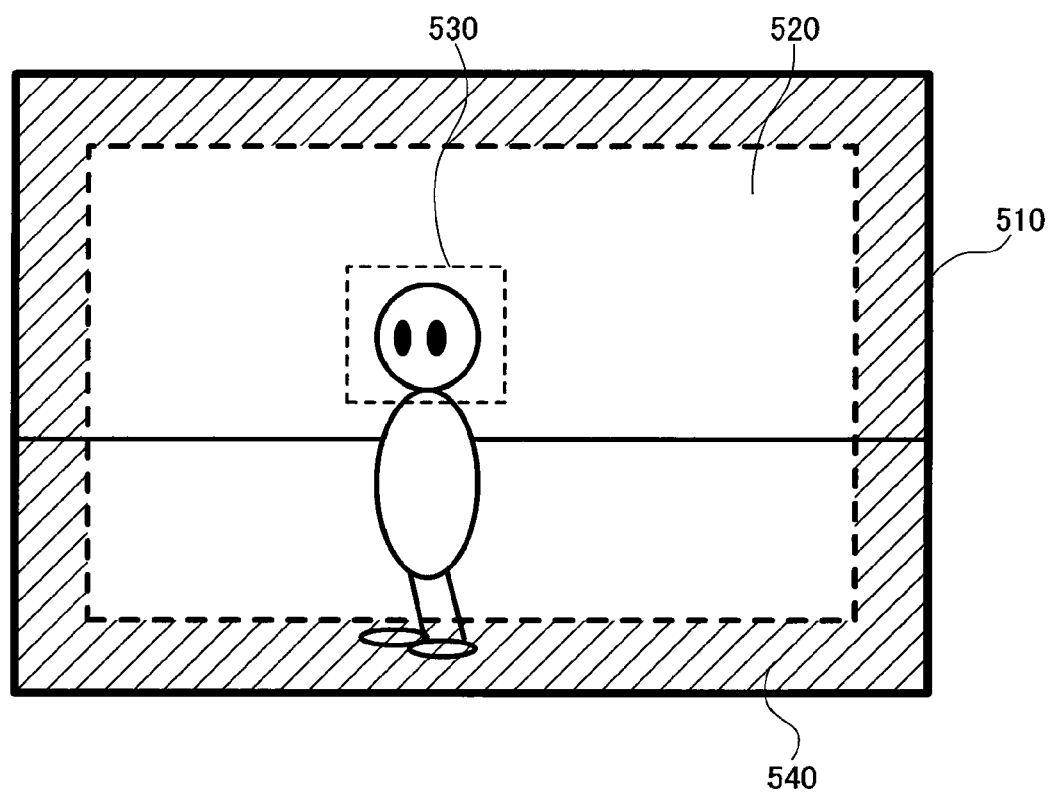
FIG. 6 illustrates a frame-in area according to Embodiment 1.

FIG. 6 illustrates the frame-in area.

As shown in FIG. 6, frame-in deciding section 391 sets in advance, in display range 510 of the shot image, frame-in area 520 which is an area one-size smaller than display range 510. When main subject 530 is located in frame-in area 520 (for example, the center location), the distance to the outer rim of display range 510 is long and main subject 530 is little likely to go out of the frame. Consequently, in this case, frame-in deciding section 391 decides that imaging apparatus 100 is in the frame-in state. On the other hand, when main subject 530 is located in area 540 outside the frame-in area, the distance to the outer rim of display range 510 is short and main subject 530 is very likely to go out of the frame. Consequently, in this case, frame-in deciding section 391 decides that imaging apparatus 100 is in the frame-out state.

Further, frame-in deciding section 391 may prepare in advance a plurality of frame-in areas of different locations and/or sizes and switch and apply the frame-in area in accordance with shooting scenes. For example, when the user wants to maintain main subject 530 in the center of the display range as much as possible, a frame-in area of a small size located in the center of the display range is adopted. Further, for example, when the face part of a person is the tracking target, it is possible to maintain the entire body of the subject in the display range by locating the frame-in area upward in the display range or shortening the length of the vertical direction of the frame-in area. A configuration is possible where the frame-in area is switched manually or, when acquiring the features of the main subject, face detection is carried out in the area of the main subject and, if the face is detected, the frame-in area is switched automatically. In this case, it is preferable to configure the degree of shifting the frame-in area upward or the degree of making the height of the frame-in area lower according to the size of the face area of the main subject. To be more specific, when the face area of the main subject is larger, the frame-in area is shifted upward and is shortened in height.

Further, as explained later, the size of the main subject detected by tracking processing in tracking processing section 390 varies between frames. Accordingly, if the face area is included in the main subject when acquiring the features of the main subject, it is preferable to reset the size and the location of the frame-in area each time the size of the main subject changes due to tracking processing.

When imaging apparatus 100 is in the frame-out state (S1600: YES), tracking processing section 390 proceeds to step S1300 and outputs report information showing that the subject is not being tracked, to reporting section 410. On the other hand, when imaging apparatus 100 is not in the frame-out state, that is, when the main subject is in the frame-in area (S1600: NO), tracking processing section 390 proceeds to step S1700.

In step S1700, tracking processing section 390 outputs report information showing that the main subject is being tracked (i.e. on tracking), to reporting section 410 from built-in frame-in deciding section 391 and proceeds to step S1400. As a result, reporting section 410 reports that the main subject is being tracked, that is, that imaging apparatus 100 is in the frame-in state, based on the illuminating state of LED section 140.

Then, in step S1400, when tracking processing section 390 decides to end the operation in tracking shooting mode because tracking shooting mode switches to another mode (S1400: NO), a series of processings end.

By carrying out such processing in tracking processing section 390, imaging apparatus 100 is able to track the main subject and report to the user whether or not imaging apparatus 100 is in the frame-in state, based on the illuminating state of LED section 140 (see FIG. 2). Imaging apparatus 100 reports whether or not imaging apparatus 100 is in the frame-in state according to changes in the illuminating state of light in the view of user 210 turning a gaze in the shooting direction. Consequently, user 210 is able to readily recognize the timing to look back at the display screen and continue shooting images in a reliable manner in a state of looking away from the display screen.

Further, imaging apparatus 100 may stop recording when the main subject has gone out of the frame or hidden completely behind objects and cannot be tracked or when the main subject has moved outside the image area to be recorded. By this means, it is possible to prevent compression processing and recording processing of video images that do not show the main subject and reduce processing load and save the capacity of recording medium 470. When the state where the main subject cannot be tracked or the state where the main subject is not in the image area to be recorded, continues a predetermined period, recording may be stopped. By this means, in cases where it returns shortly to such a state that tracking is possible or that the main subject is located in the image area, it is possible not to stop recording.

Next, tracking processing executed by tracking processing section 390 in step 1200 of FIG. 5 will be explained in detail.

Figure 7:
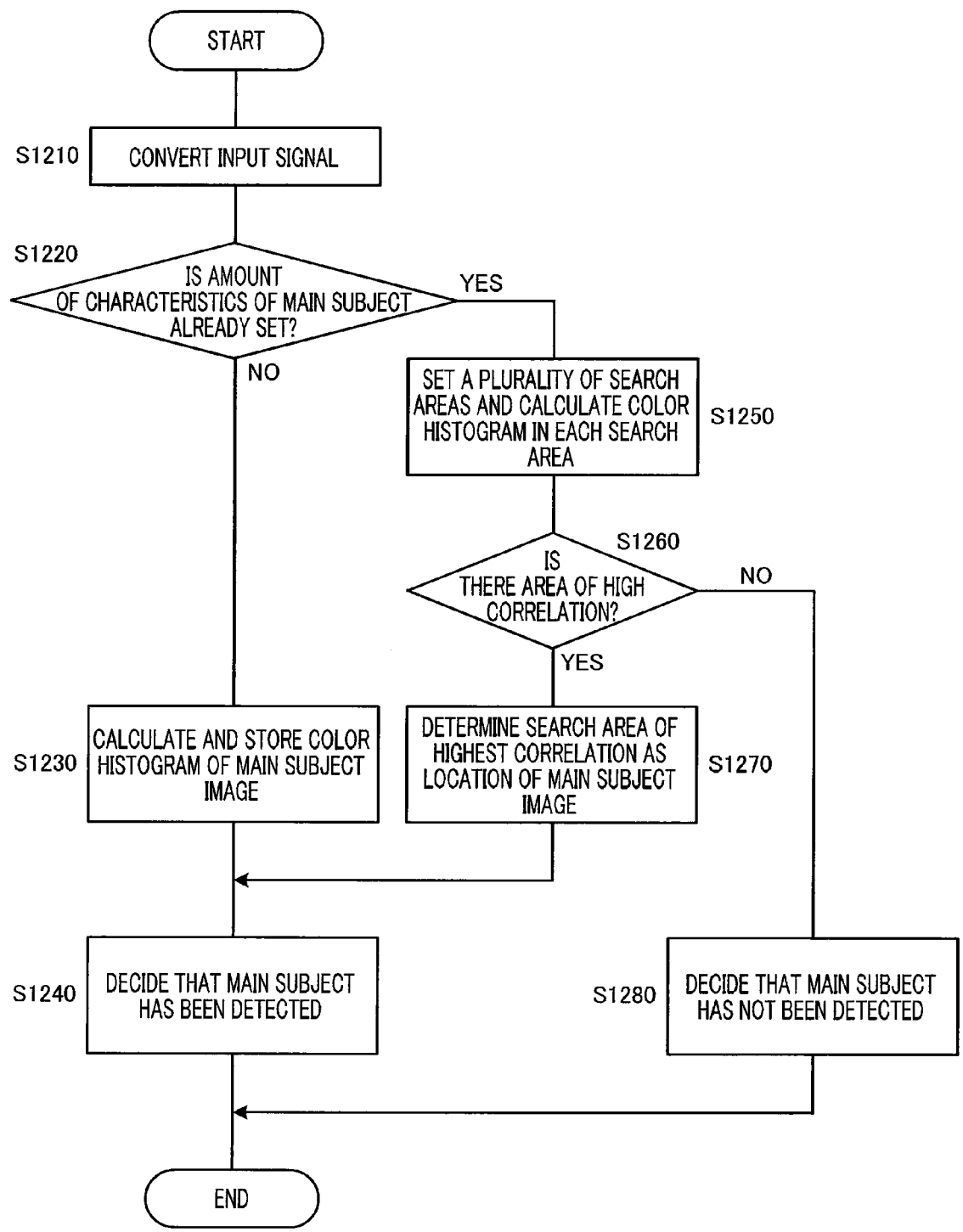
FIG. 7 is a flowchart showing tracking processing according to Embodiment 1.

FIG. 7 is a flowchart showing tracking processing in tracking processing section 390.

First, in step S1210, tracking processing section 390 converts an RGB format video signal inputted from video signal processing section 350, into a video signal of a predetermined format suitable for tracking the main subject. With the present embodiment, tracking processing section 390 downsizes an image to reduce the amount of arithmetic operation upon an area search and converts the video signal of the downsized image into an HSV (hue, saturation, and value) format video signal. The hue component of the HSV format video signal is used to calculate the color histogram (explained later). By using the hue component, it is possible to provide the features which is less susceptible to the influence of changes of the brightness of the main subject. Consequently, in cases where the main subject moves from the sun to the shade, it is possible to provide an advantage of reducing the possibility of detecting the location of the main subject by error.

Then, in step S1220, tracking processing section 390 decides whether or not the color histogram of the main subject has already been set as the features of the main subject. The color histogram shows a distribution of the frequency each hue component appears in an image and is one of the features which are less susceptible to the influence of changes of the shape of the subject. Tracking processing section 390 proceeds to step S1230 when the features of main subject is not set yet (S1220: NO).

In step S1230, tracking processing section 390 sets the main subject and calculates the color histogram of the set main subject. Then, tracking processing section 390 stores the calculated color histogram in a memory (not shown) provided in, for example, tracking processing section 390. The stored color histogram of the main subject is referred to when the location of the main subject is searched for.

When the main subject is a person, the main subject is set by, for example, acquiring the features of the face of the main subject recorded in recording medium 470 and recognizing the face of the main subject in the input image based on the acquired features. Further, the main subject may be set by receiving as input an enter operation by pressing a shooting button in a state where the frame for setting the main subject is displayed on the display screen and by acquiring the image in the frame when the enter operation is performed.

Then, in step S1240, tracking processing section 390 decides that the main subject has been detected and returns to the processing of FIG. 5. Then, each time a new frame is inputted in tracking processing section 390, processing proceeds to step S1210.

In case of the second or subsequent tracking processing, that is, in case where the features of main subject is already set (S1220: YES), tracking processing section 390 proceeds to step S1250.

In step S1250, tracking processing section 390 sets a plurality of search areas based on the location of the main subject acquired as a result of tracking in the previous frame. Tracking processing section 390 stores in advance candidate point distribution where the set density of each candidate point for the current location of the main subject increases as the current location of the main subject comes closer to the reference location (the location of the main subject in the previous frame) and sets a plurality of search areas (candidate areas) randomly in accordance with the stored candidate point distribution, for example. Then, tracking processing section 390 calculates the color histogram for each of the set search areas. Similar to candidate point distribution, the size of the search area is set at random within a predetermined range which is based on the size of the main subject in the previous frame. By so doing, it is also possible to follow changes of the size of the main subject.

When a search area is set at random, there is a possibility that the main subject is not detected even though the main subject is in the display range, and that an erroneous notice is presented. However, this notice error functions on the safe side, and, therefore, the function for maintaining the frame-in state of imaging apparatus 100 is not blocked. By contrast with this, when the number of candidate points are set such that the detection accuracy is kept sufficiently high, processing load increases. Consequently, by setting candidate points at random, it is possible to present an effective notice for maintaining the frame-in state of imaging apparatus 100 in a state where processing load is reduced.

Further, different candidate point distributions may be adopted between the frame-in area and the frame-out area. For example, to prioritize maintenance of the frame-in state of imaging apparatus 100, candidate point distribution may be adopted where more search areas are set in the frame-out area. In this case, although the main subject is located in the frame-in area, an erroneous notice showing the frame-out state is more likely to be sent. However, when the main subject is in the frame-out area, this can be reported in a more reliable manner.

Then, in step S1260, tracking processing section 390 decides whether or not there is a search area highly correlated with the main subject. To be more specific, tracking processing section 390, for example, calculates the color histogram for each search area, adopts a histogram intersection method for the calculated color histogram and the color histogram of the main subject and calculates the similarity between the search area and the main subject. Then, tracking processing section 390 decides that the search area where the calculated similarity is no less than a predetermined value, is highly correlated with the main subject. When there is a search area highly correlated with the main subject (S1260: YES), tracking processing section 390 proceeds to step S1270.

In step S1270, tracking processing section 390 determines the search area highly correlated with the main subject as the current location of the main subject and proceeds to step S1240 to decide that the main subject has been detected. Further, when a search area where the above-explained similarity becomes a sufficiently high value is discovered, this search area may be determined as the current location of the main subject. In this case, it is possible to determine the current location of the main subject promptly with less processing load.

On the other hand, when there is no search area highly correlated with the main subject (S1260: NO), tracking processing section 390 proceeds to step S1280.

In step S1280, tracking processing section 390 decides that the main subject has not been detected and returns to processing in FIG. 5. The condition where the main subject cannot be detected is, for example, a case where the main subject has gone out of the frame completely or hidden behind objects as explained above.

By repeating such tracking processing, tracking processing section 390 decides repeatedly whether or not the main subject has been detected. Further, there is a possibility that a search area in which the main subject is not located is the most highly correlated area by accident. Consequently, when a plurality of the above-explained search areas having the similarity no more than the predetermined value are found, tracking processing section 390 may proceed to step S1280 to decide that the main subject has not been detected, in order to avoid error detection. Further, tracking processing section 390 may use other methods of utilizing normalized brightness distribution or adopting a template matching method to decide the correlation. Further, the correlation decision reliability may be improved by combining a plurality of methods.

Next, the switching pattern of the illuminating state of LED section 140 will be explained.

The illuminating state of LED section 140 is switched depending on whether or not the main subject is being tracked. The difference between these two illuminating states only needs to be recognized easily by the user, so that various patterns of illuminating states are possible.

Reporting section 410 has a plurality of LED's of different light emitting colors in LED section 140 and performs multicolor display, for example, blue LED is illuminated during tracking and red LED is illuminated after tracking ends. Or, reporting section 410 changes intervals for repeating flashes of LED section 140 during tracking and after tracking ends. Or, reporting section 410 illuminates LED section 140 only during tracking and turns off the illumination of LED section 140 except during tracking. Adversely, reporting section 410 may turn off the illumination of LED section 140 only during tracking and illuminate LED section 140 except during tracking.

Further, light outputted from LED section 140 has a possibility to influence the hue of the subject. For example, when images are shot in a dark place, light outputted from LED section 140 significantly influences the hue of the subject. Further, when LED section 140 flashes, the amount of light in the surrounding changes according to the flash of LED section 140 and, therefore, the brightness of a video image to be shot is not constant. Further, when LED section 140 emits chromatic color light, the emitted light color is reflected by the surrounding object and shooting an image is not possible in correct color.

On the other hand, when the amount of light emitted by LED section 140 is too small, it is not easy for the user to recognize the change in the illuminating state particularly in a bright place such as an outside on a sunny day.

Consequently, imaging apparatus 100 according to the present embodiment is able to adjust the amount of light emitted by LED section 140. To be more specific, system controlling section 450 stores light emission level setting mode of LED section 140 provided in reporting section 410. When light emission level setting mode is manual setting mode, system controlling section 450 receives as input a light emission level set manually by the user and stores the setting detail. Further, when light emission level setting mode is selected as automatic adjusting mode, system controlling section 450 automatically determines an optimal light emission level according to the amount of light in the surrounding. When the setting of the light emission level is changed by the user in manual setting mode or when the light emission level is changed in automatic adjusting mode, system controlling section 450 reports a new light emission level as light emission level information to reporting section 410. Reporting section 410 stores the light emission level information received from system controlling section 450 and adjusts the amount of light emitted by LED section 140 according to the stored light emission level information.

Figure 8:
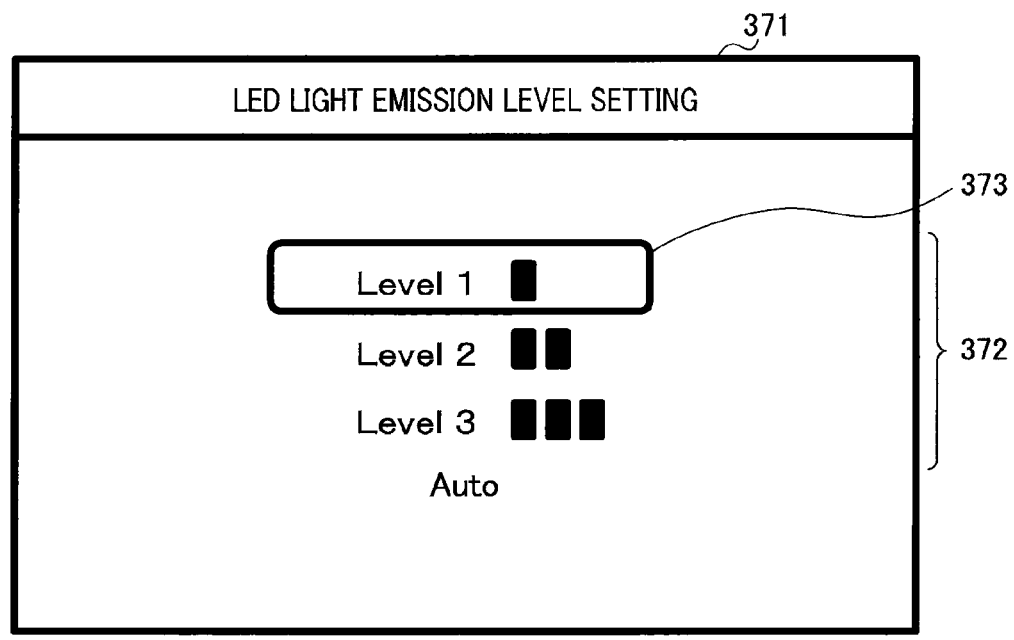
FIG. 8 is a plain view showing an example of a light emission level setting screen according to Embodiment 1.

FIG. 8 is a plan view showing an example of a light emission level setting screen.

As shown in FIG. 8, light emission level setting screen 371 displays, as a menu for adjusting the amount of light, four items 372 of items for manual setting of three light emission levels and an item for automatic adjustment for automatically adjusting the light emission level according to the amount of light in the surrounding. Four items 372 can be selected by the movement of cursor 373 and the enter operation. The display of light emission level setting screen 371, the movement of cursor 373 and the enter operation are carried out by the user's operation of operating section 380 in FIG. 4.

When the item for automatic setting is selected in light emission level setting screen 371, system controlling section 450 automatically determines light emission level information used to adjust the amount of light emitted by LED section 140, according to the amount of brightness of a video image. To be more specific, system controlling section 450 stores in advance a table which is created based on experiment data and which associates the amount of brightness of the video image and light emission level information showing the optimal amount of light emitted by LED section 140 matching the amount of brightness, and determines light emission level information with reference to this table. The amount of brightness of a video image can be acquired based on the average level of the Y signal component reported from video signal processing section 350.

On the other hand, when the item for manual setting for one of light emission levels is selected in light emission level setting screen 271, system controlling section 450 reports light emission level information matching the selected item, to reporting section 410. Reporting section 410 fixes the amount of light emitted by LED section 140 to an applicable amount of emitted light according to the received light emission level information.

By adjusting the amount of light emitted by LED section 140 in this way, imaging apparatus 100 is able to report in a more reliable manner whether or not the main subject is being tracked, to the user in a state where the influence of the illumination of LED section 140 upon the hue of the subject is suppressed.

As explained above, according to the present embodiment, imaging apparatus 100 switches the illuminating state of LED section 140 provided on the upper surface of apparatus body 120 depending on whether or not imaging apparatus 100 is in the frame-in state. That is, even when user 210 moves eyes away from the display screen and turns a gaze in the shooting direction, imaging apparatus 100 reports whether or not imaging apparatus 100 is in the frame-in state, within the view of user 210 based on the illuminating state of light. By this means, when the main subject has gone out of the frame or is about to go out of the frame, imaging apparatus 100 is able to make user 210 recognize easily the timing to gaze at the display screen. Consequently, user 210 is able to shoot images such that the main subject is in the display screen without the user's continuing gazing at the display screen.

Further, although a case has been explained with the present embodiment where LED section 140 is arranged on the upper surface of apparatus body 120, the present invention is not limited to this. For example, LED section 140 may be arranged anywhere in imaging apparatus 100 as long as it is located in the user's view in the state of normal shooting. For example, LED section 140 may be provided in the lateral side or the back side of apparatus body 120 or on the surface of monitor 130.

Embodiment 2

Embodiment 2 of the present invention shows an example where LED section 140 of Embodiment 1 is arranged in the imaging apparatus on the side of the subject.

Figure 9:
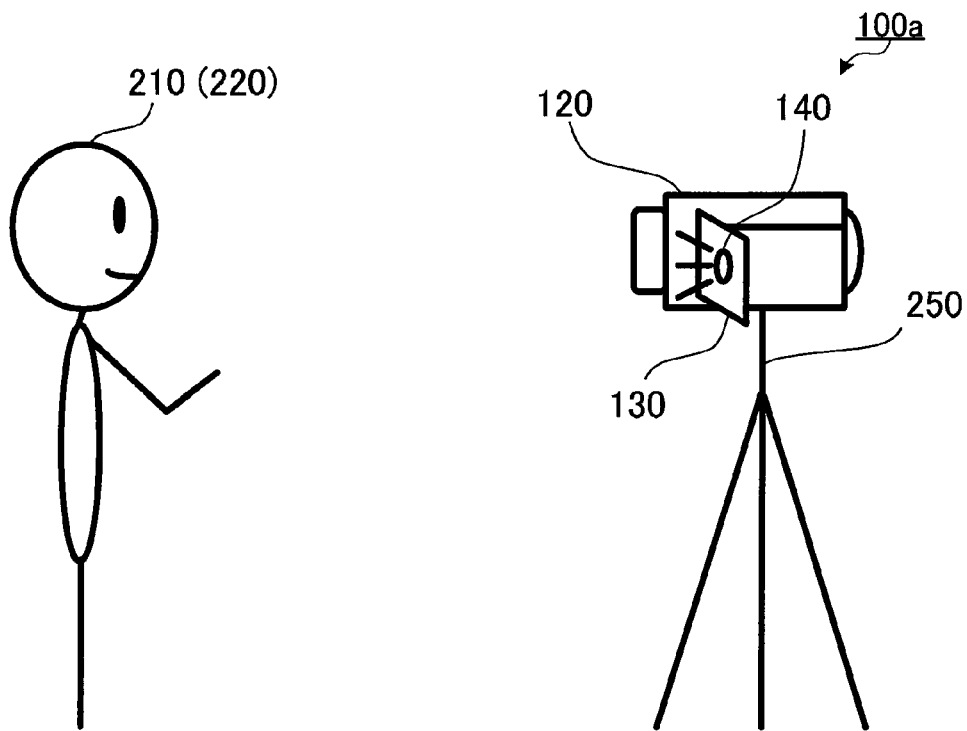
FIG. 9 shows an example where an imaging apparatus according to Embodiment 2 of the present invention is used to shoot images.

FIG. 9 shows an example where an imaging apparatus according to Embodiment 2 of the present invention is used to shoot an image, and corresponds to FIG. 2 of Embodiment 1. The same components as in FIG. 2 will be assigned same reference numerals and explanation therefore will be omitted.

As shown in FIG. 9, imaging apparatus 100a of Embodiment 2 differs from imaging apparatus 100 of Embodiment 1 in arranging LED section 140 in the outer surface which is on the opposite side to the display screen of monitor 130. By this means, LED section 140 can be visually checked from the direction in which imaging apparatus 100 shoots images in a state where monitor 130 is open with respect to apparatus body 120. Further, imaging apparatus 100a acquires in advance the features of the face of main subject 220 and recognizes the face of main subject 220 from an input image.

Main subject 220 is, for example, user 210 himself/herself. Main subject 220 starts shooting images in tracking shooting mode by fixing imaging apparatus 100a by tripod stand 250. Then, main subject 220 moves toward the direction in which imaging apparatus 100a shoots images, and adjusts the main subject's position by checking LED section 140 with eyes such that LED section 140 enters the illuminating state showing that the main subject is being tracked.

According to such imaging apparatus 100a, main subject 220 is able to readily learn whether or not main subject 220 is being tracked by imaging apparatus 100a. By this means, when main subject 220 shoots the image of himself/herself, main subject 220 is able to adjust his/her location without others' help such that the image of himself/herself does not go out of the frame as much as possible.

Further, for example, when images of only children are shot by fixed imaging apparatus 100, there are cases where user 210 wants to make himself/herself go out of the frame as much as possible. In such a case, according to imaging apparatus 100a of the present embodiment, main subject 220 is able to readily adjust his/her location without others' help such that the image of himself/herself goes out of the frame as much as possible.

Embodiment 3

Embodiment 3 of the present invention is an example where whether or not the subject is being tracked is reported using a monitor. The imaging apparatus according to the present embodiment has the same configuration as in imaging apparatus 100 of Embodiment 1 except that LED section 140 is not provided and display section 370 is combined with reporting section 410 in switching the illuminating state of the display screen.

Figure 10:
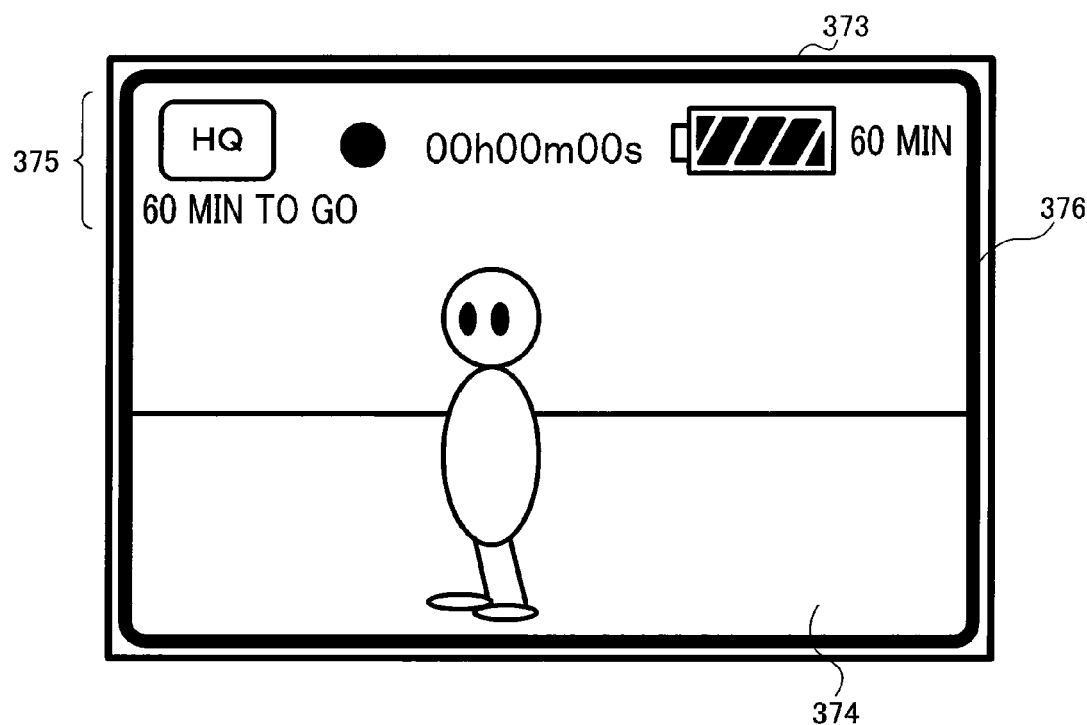
FIG. 10 is a plain view showing an example of a display screen of an imaging apparatus according to Embodiment 3 of the present invention.

FIG. 10 is a plan view showing an example of a display screen of an imaging apparatus according to Embodiment 3 of the present invention.

As shown in FIG. 10, display screen 373 displays notice image 376 in addition to digital video information 374 and various OSD displays 375. Notice image 376 is generated in system controlling section 450 according to report information from frame-in deciding section 391 of tracking processing section 390 and is drawn in display section 370. Notice image 376 employs a style that can be readily recognized without gazing at notice image 376 in display screen 373 as long as notice image 376 is in the view. For example, notice image 376 is a yellow frame of a predetermined width along the outer rim of display screen 373. Further, preferably, notice image 376 employs a style of a flash display or a simple animation display to be distinct. Further, the style of notice image 376 is not limited to the above, and, for example, a style of flashing display screen 373 entirely is possible.

Such an imaging apparatus is directed to reporting information showing that the subject is being tracked or information showing that the subject is not being tracked, so that it is possible to simplify display content in notice image 376 compared to the case where the location of the main subject in the display screen is displayed. Further, as a result, notice image 376 can employ a style which uses a large part of display screen 373. By this means, it is possible to make the user recognize in a more reliable and easier manner whether or not imaging apparatus 100 is in the frame-in state.

Further, a notice is presented utilizing an apparatus section for displaying a shot image and, consequently, LED section 140 of Embodiment 1 needs not to be provided additionally, so that it is possible to present a notice by means of light while suppressing an increase in cost.

Embodiment 4

Embodiment 4 of the present invention is an example where sound output is added in a reporting terminal carried by the user to report whether or not the subject is being tracked.

Figure 11:
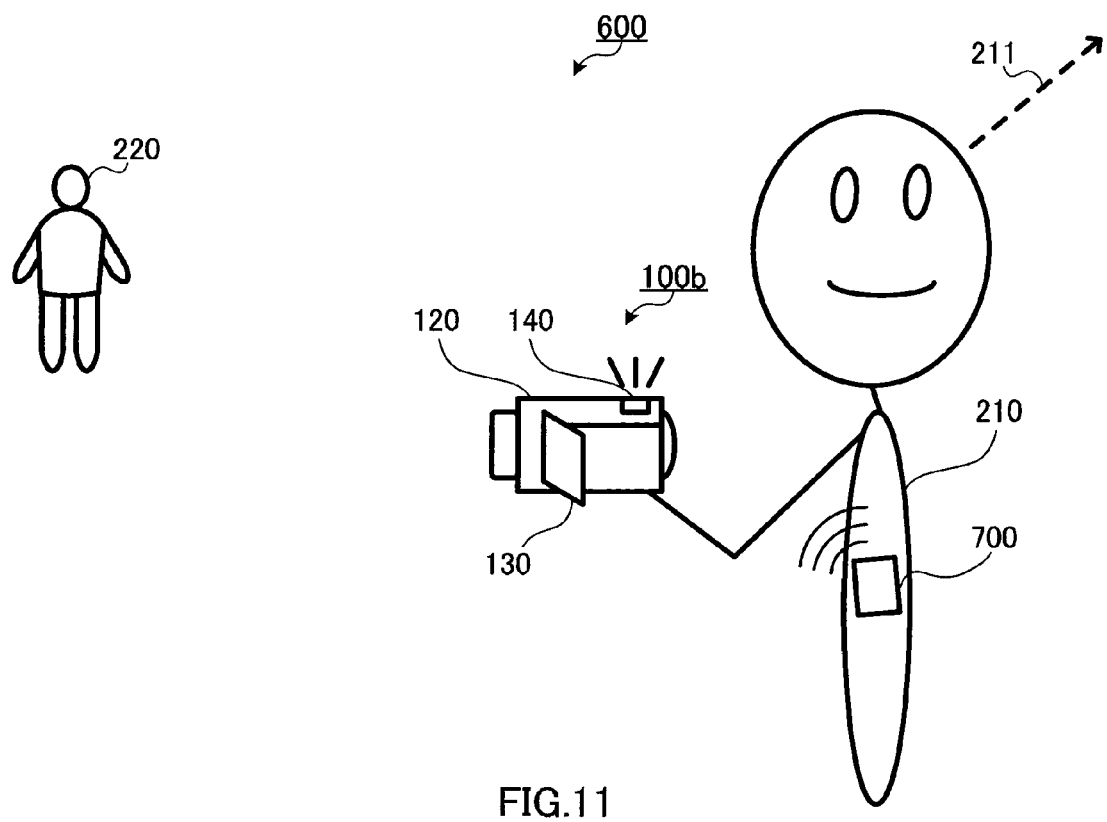
FIG. 11 shows an example where an imaging system according to Embodiment 4 of the present invention is used to shoot images.

FIG. 11 shows an example where imaging system 600 according to Embodiment 4 of the present invention is used to shoot images, and corresponds to FIG. 2 of Embodiment 1. The same parts as in FIG. 2 will be assigned the same reference numerals and explanation thereof will be omitted.

As shown in FIG. 11, imaging system 600 has imaging apparatus 100b and reporting terminal 700.

In addition to the same function as in imaging apparatus 100 of Embodiment 1, imaging apparatus 100b has a function of transmitting report information by a wireless signal showing whether or not the main subject is located in the display range, to reporting terminal 700.

Reporting terminal 700 receives report information from imaging apparatus 100b and outputs sound according to the content of the received report information. Reporting terminal 700 is, for example, a mobile telephone or PDA (personal digital assistant).

As shown in FIG. 11, even when user 210 turns gaze 211 in a direction other than the shooting direction or the direction in which LED section 140 is not in the view of user 210, such imaging system 600 is able to report the content of report information to user 210.

Figure 12:
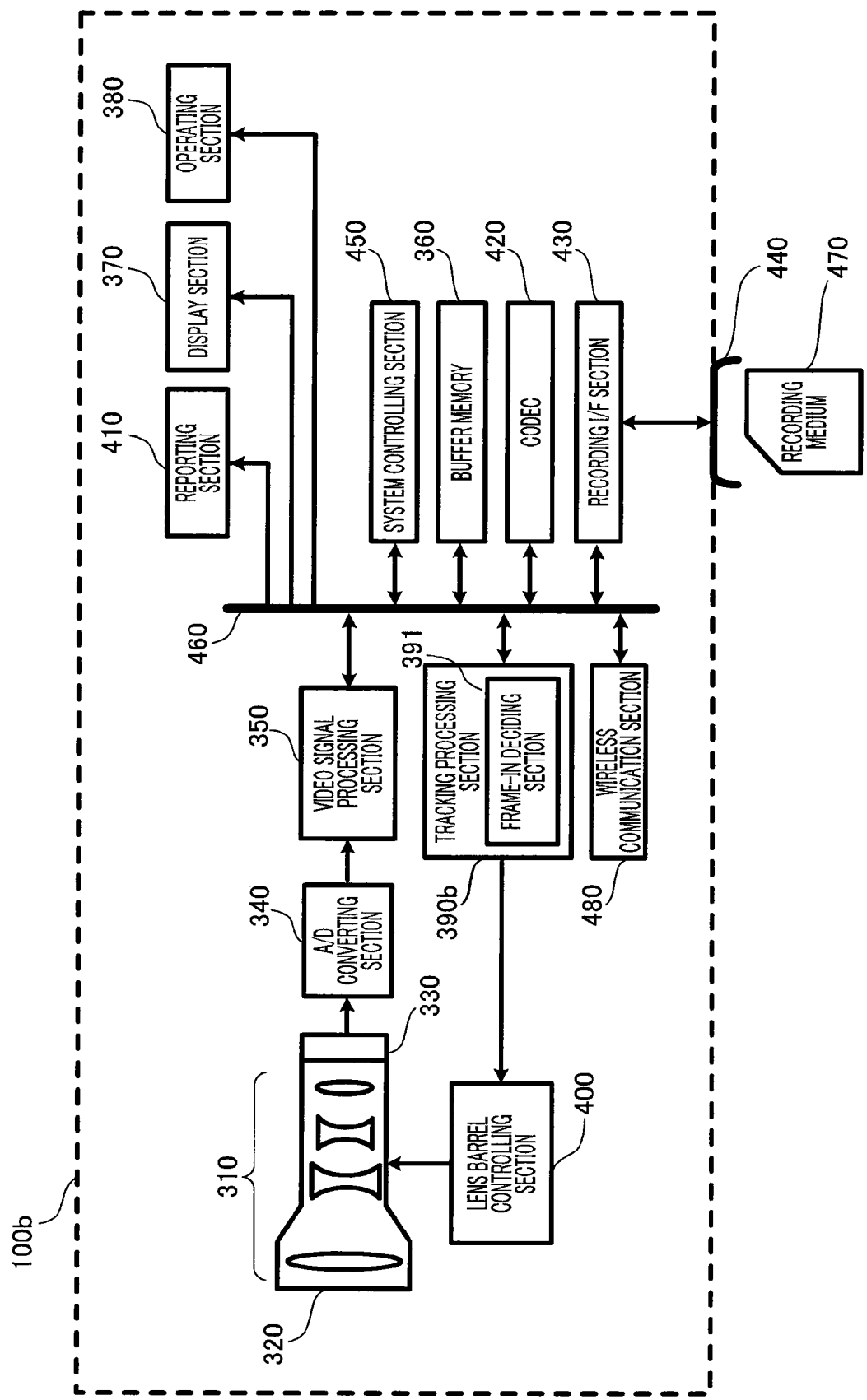
FIG. 12 is a block diagram showing a configuration of the imaging apparatus according to Embodiment 4.

FIG. 12 is a block diagram showing a configuration of imaging apparatus 100b shown in FIG. 11b, and corresponds to FIG. 4 of Embodiment 1. The same parts as in FIG. 4 will be assigned the same reference numerals and explanation thereof will be omitted.

In FIG. 12, imaging apparatus 100b has wireless communication section 480 connected with system bus 460 in addition to the configuration of FIG. 4. Further, imaging apparatus 100b has tracking processing section 390b instead of tracking processing section 390 of FIG. 4.

Tracking processing section 390b outputs start information to wireless communication section 480 upon a start of tracking processing and outputs end information to wireless communication section 480 upon an end of tracking processing. Further, report information generated in frame-in deciding section 391 of tracking processing section 390b is outputted not only to reporting section 410 but also to wireless communication section 480.

Wireless communication section 480 has a modulating section that acquires a wireless signal by modulating tracking information into a wireless frequency and an antenna section that sends out the wireless signal acquired in the modulating section (both not shown). Wireless communication section 480 transmits start information and end information inputted from tracking processing section 390b, to reporting terminal 700 by wireless communication. Further, while report information inputted from tracking processing section 390b shows that the subject is being tracked, wireless communication section 480 transmits tracking information showing that the subject is being tracked, to reporting terminal 700 of FIG. 11.

Figure 13:
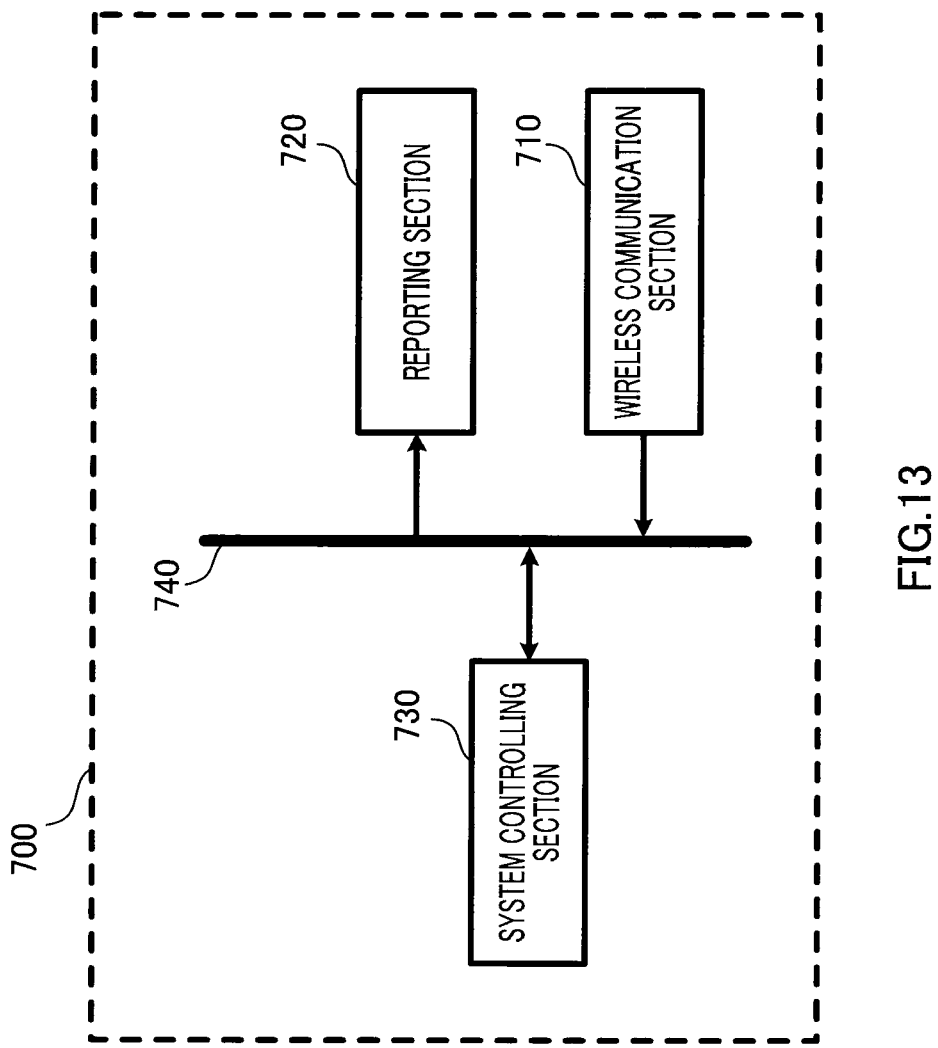
FIG. 13 is a block diagram of a reporting terminal according to Embodiment 4.

FIG. 13 is a block diagram showing a configuration of reporting terminal 700 shown in FIG. 11.

As shown in FIG. 13, reporting terminal 700 has wireless communication section 710, reporting section 720 and system controlling section 730. These apparatus sections are each connected with system bus 740.

Wireless communication section 710 receives tracking information transmitted by a wireless signal from imaging apparatus 100b. Wireless communication section 710 has an antenna section that receives the wireless signal sent out from imaging apparatus 100b and a demodulating section that demodulates the wireless signal received at the antenna section (both not shown). Wireless communication section 710 receives tracking information transmitted by the wireless signal from imaging apparatus 100b.

Reporting section 720 outputs sound while wireless communication section 710 receives tracking information. Reporting section 720 has a D/A converting section that acquires an analog sound signal by D/A converting sound information (explained later) and a speaker that converts the analog sound signal acquired in the D/A converting section into sound (both not shown).

System controlling section 730 is formed with a CPU, a ROM that records a program and a RAM for executing the program (all not shown), and integrally controls the operation of each section of reporting terminal 700, through system bus 740.

The operations of imaging apparatus 100b and reporting terminal 700 will be explained below.

Imaging apparatus 100b executes the same processing as tracking processing shown in FIG. 5 of Embodiment 1 in tracking processing section 390b. At this point, tracking processing section 390b transmits start information to reporting terminal 700 through wireless communication section 480 each time tracking processing starts, and transmits end information to reporting terminal 700 through wireless communication section 480 each time tracking processing ends. Further, tracking processing section 390b also outputs report information to wireless communication section 480 in step S1300 and step S1700 of FIG. 5. As a result, when tracking processing is carried out, report information showing whether or not the subject is being tracked is modulated into a wireless signal in wireless communication section 480 and is transmitted to reporting terminal 700.

When receiving start information from imaging apparatus 100b, reporting terminal 700 executes tracking-reporting processing for reporting whether or not imaging apparatus 100b is tracking the main subject.

Figure 14:
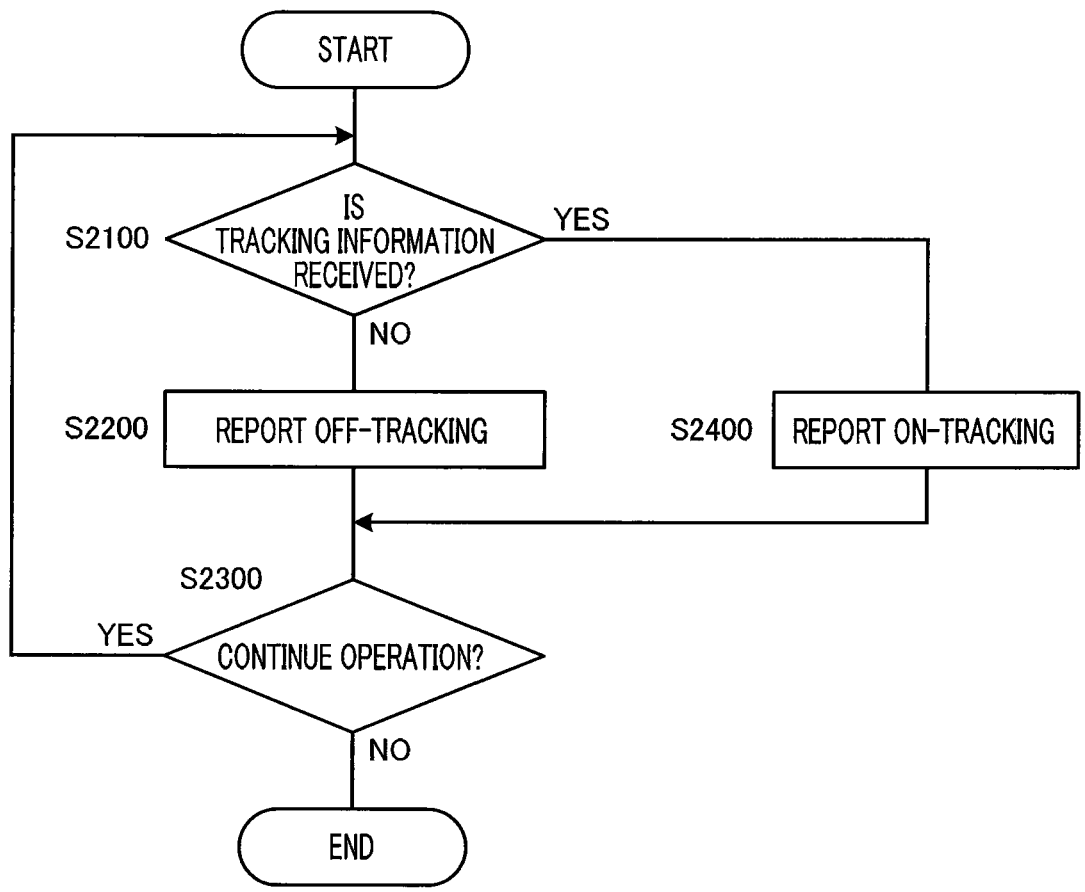
FIG. 14 is a flowchart showing tracking-reporting processing in the reporting terminal according to Embodiment 4.

FIG. 14 is a flowchart showing tracking-reporting processing executed by reporting terminal 700.

First, in step S2100, wireless communication section 710 decides whether tracking information is received from imaging apparatus 100b. When tracking information is not received (S2100: NO), wireless communication section 710 proceeds to step S2200, and, when tracking information is received (S2100: YES), reports to system controlling section 730 that tracking information has been received, and proceeds to step S2400.

In step S2200, system controlling section 730 carries out an operation to show that imaging apparatus 100b is not tracking the main subject (i.e. off tracking), that is, that imaging apparatus 100*b* is in the frame-out state. Here, system controlling section 730 carries out an operation not to output sound information (explained later) to reporting section 720.

Then, in step S2300, system controlling section 730 decides whether or not to continue the operation, and, when deciding to continue the operation (S2300: YES), returns to step S2100.

On the other hand, in step S2400, system controlling section 730 carries out an operation to show that imaging apparatus 100*b* is tracking the main subject (i.e. on tracking), that is, that imaging apparatus 100*b* is in the frame-in state, and proceeds to step S2300. Here, system controlling section 730 outputs sound information for outputting predetermined sound, to reporting section 720. As a result, reporting section 720 outputs sound associated with sound information.

Then, when deciding not to continue the operation because end information is received from imaging apparatus 100*b* (S2300: NO), system controlling section 730 ends a series of processings.

By means of such tracking-reporting processing, reporting terminal 700 outputs sound only when imaging apparatus 100*b* is in the frame-in state.

In this way, imaging system 600 of the present embodiment is able to report that the main subject is being tracked, by outputting sound from reporting terminal 700, and report that the main subject is not being tracked, by not outputting sound from reporting terminal 700. Consequently, user 210 is able to move a gaze freely during the shooting operation and shoot images in a more relaxed manner. Further, sound is outputted from reporting terminal 700 instead of imaging apparatus 100*b*, so that it is possible to prevent sound from being recorded in a high volume when imaging apparatus 100*b* records sound and shoots video images at the same time.

Further, main subject 220 may carry reporting terminal 220. By this means, similar to Embodiment 2, when shooting main subject 220, main subject 220 is able to adjust his/her location without others' help such that imaging apparatus 100*b* enters the frame-in state or imaging apparatus 100*b* does not enter the frame-in state. Further, according to the present embodiment, even when imaging apparatus 100*b* and main subject 220 are distant apart and it is difficult to visually check light emitted from imaging apparatus 100*a*, it is possible to present a notice to main subject 220.

Further, a configuration may be possible where the volume of sound can be adjusted by arranging a dial for adjusting the sound volume in reporting terminal 700 such that the sound accompanying a notice is not recorded in imaging apparatus 100*b*.

Further, it is also possible to adopt various sound output patterns for outputting sound only when the subject is not being tracked or outputting different sounds between when the subject is being tracked and when the subject is not being tracked.

Embodiment 5

Embodiment 5 of the present invention is an example where that the subject is being tracked is reported in the reporting terminal of Embodiment 4 by means of vibration.

The reporting terminal of the present embodiment employs the same configuration of reporting terminal 700 shown in FIG. 13 of Embodiment 4 and carries out the same processing as tracking-reporting processing shown in FIG. 14. However, when receiving a report that tracking information has been received from the wireless communication section, the system controlling section outputs vibration information for outputting vibration, instead of sound information, in step S2400 of FIG. 14. Reporting section 720 has a vibration motor that is popular as a vibration function in a mobile telephone and drives the vibration motor based on an analog signal acquired by D/A converting vibration information. It is preferable to adopt the brushless vibration motor disclosed in, for example, Japanese Patent No. 3159212.

Such a reporting terminal is able to report whether or not the imaging apparatus is in the frame-in state, to the user or main subject without outputting sound, so that it is possible to maintain or bring back the main subject in the frame-in state without any particular influence upon recorded sound or surrounding environment.

Although cases have been explained with the above-explained embodiments where the imaging apparatus is a home video camera or camcorder, the present invention is applicable to various imaging apparatuses for shooting an optical image of the subject such as digital cameras for shooting still images.

Further, although cases have been explained with the above embodiments where the lens barrel is controlled to be driven as a means for carrying out tracking processing of arranging the main subject in the center of the screen, the present invention is not limited to this. For example, moving the lens, processing of cutting out video images and moving a solid-state image sensor may be adopted as tracking processing.

Further, although cases have been explained with the above embodiments where the image area in which the main subject can be tracked, the image area displayed on monitor 130 and the image area that is actually recorded match, the present invention is not limited to this. For example, when the image area to be recorded is smaller than the image area displayed on monitor 130, it is preferable to set the frame-in area in the image area to be recorded.

Further, the present invention is directed to a reporting means related to tracking processing, and, consequently, does not depend on the function of the imaging apparatus implemented by tracking processing. Consequently, the present invention is applicable to an imaging apparatus that uses tracking processing for AF (auto focus) control or exposure control and the like and that carries out AF control and optimal exposure control for the location of the main subject determined by tracking processing.

The imaging apparatus, the imaging apparatus body and the reporting terminal according to the present invention are useful for an imaging apparatus, an imaging apparatus body and a reporting terminal that can assist such shooting that a designated subject is accommodated in a predetermined reference range without user's continuing gazing at the display screen. Particularly, the present invention provides an advantage of readily recognizing that tracking processing is being carried out, so that the present invention improves the effectiveness of the function of tracking the subject and is useful for various imaging apparatuses such as digital cameras and digital video cameras with tracking functions.

What is claimed is:

1. An imaging apparatus comprising:
    an imaging optical system that forms an optical image of a subject;
    an imaging section that converts the optical image into an electrical signal;
    a signal processing section that carries out a predetermined processing for the electrical signal and generates image data; and
    a deciding section that decides whether a designated subject is in a predetermined reference range within a trackable range, using the image data generated in the signal processing section, wherein, when the designated subject includes a face of a person, the predetermined reference range is set with a shorter vertical range as compared to another reference range that is set when the designated subject does not include the face of the person.

2. An imaging apparatus comprising:

an imaging optical system that forms an optical image of a subject;

an imaging section that converts the optical image into an electrical signal;

a signal processing section that carries out a predetermined processing for the electrical signal and generates image data; and a deciding section that decides whether or not a designated subject is in a predetermined reference range within a trackable range, using the image data generated in the signal processing section, wherein, when the designated subject includes a face of a person, a length of the predetermined reference range in a vertical direction is set shorter than another reference range that is set when the designated subject does not include the face of the person, and a length of the predetermined reference range in a horizontal direction is set equal to said another reference range.

3. An imaging apparatus comprising:

an imaging optical system that forms an optical image of a subject;

an imaging section that converts the optical image into an electrical signal;

a signal processing section that carries out a predetermined processing for the electrical signal and generates image data; and a deciding section that decides whether a designated subject is in a predetermined reference range within a trackable range, using the image data generated in the signal processing section, wherein, when the designated subject includes a face of a person, the predetermined reference range is set with a shorter vertical range compared to another reference range that is set when the designated subject does not include the face of the person, and the predetermined reference range is further set within the other reference range.

* * * * *